United States Patent [19]

Fiedelius

[11] Patent Number: 4,870,240
[45] Date of Patent: Sep. 26, 1989

[54] APPARATUS FOR CONTACTING WIRES WITH RESISTANCE WELDING

[75] Inventor: Gerhard Fiedelius, Wolfratshausen, Fed. Rep. of Germany

[73] Assignee: Siemens Aktiengesellschaft, Berlin and Munich, Fed. Rep. of Germany

[21] Appl. No.: 133,496

[22] Filed: Dec. 15, 1987

[30] Foreign Application Priority Data

Jan. 30, 1987 [DE] Fed. Rep. of Germany ....... 3702822

[51] Int. Cl.⁴ ............................................ B23K 11/16
[52] U.S. Cl. ................................. 219/56.1; 219/56.22
[58] Field of Search ...................... 219/56, 56.1, 56.22, 219/91.21, 91.22, 119

[56] References Cited

U.S. PATENT DOCUMENTS 4,230,925 10/1980 Lascelles .............................. 219/56.1
4,339,651 7/1982 Kraus .
4,465,913 8/1984 Stokoe et al. ........................ 219/56.1

FOREIGN PATENT DOCUMENTS 3233225 3/1983 Fed. Rep. of Germany .
2111759 7/1983 United Kingdom .

OTHER PUBLICATIONS

Article by Von G. Ritter from the Periodical Feinwerktechnik, vol. 75, 1972, No. 5, pp. 201–206.
Article by Von F. Eichhorn from the Periodical Feinwerktechnik, vol. 73, 1969, No. 5, pp. 209–216.

*Primary Examiner*—C. L. Albritton
*Assistant Examiner*—Lincoln Donovan
*Attorney, Agent, or Firm*—Hill, Van Santen, Steadman & Simpson

[57] ABSTRACT

A resistance welding apparatus includes a first working electrode parallel to a second contact electrode, the working electrode having a guide channel for wires or ribbons which opens at an end face so that a resistance weld of the wire to a terminal is accomplished to form wire or ribbon bridges.

10 Claims, 1 Drawing Sheet

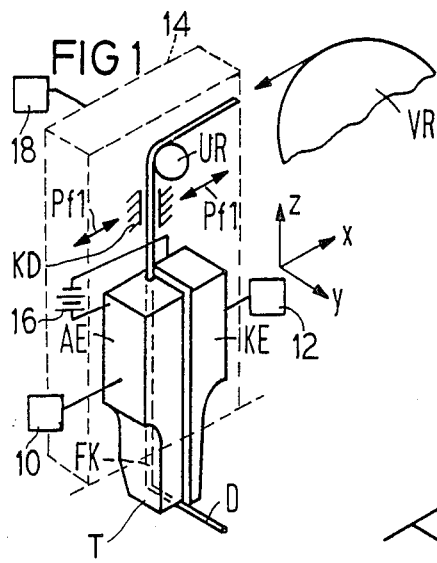
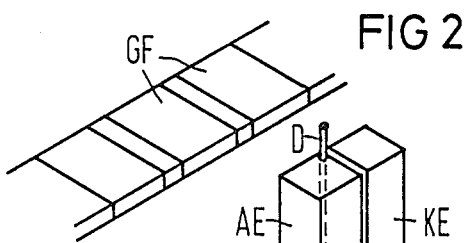
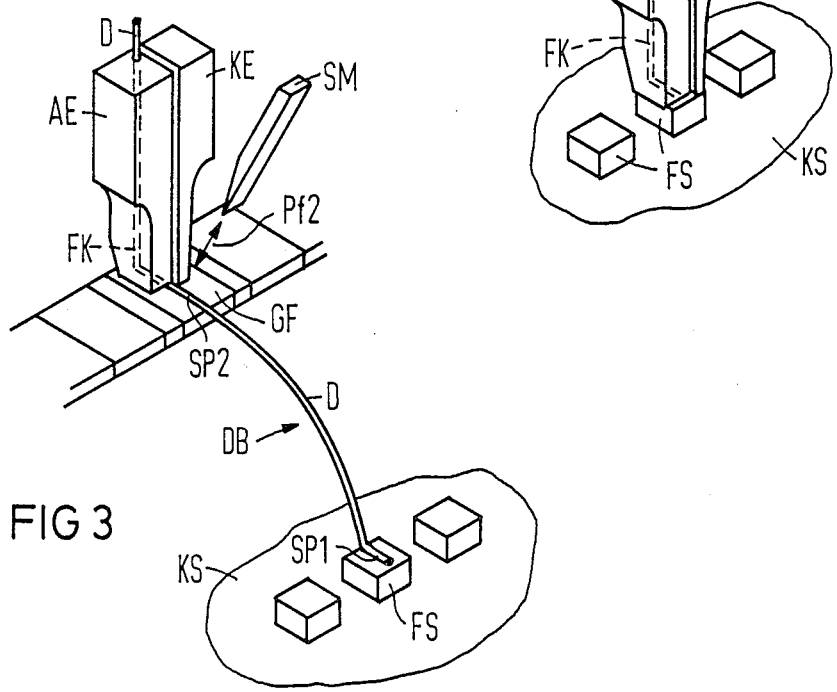

APPARATUS FOR CONTACTING WIRES WITH RESISTANCE WELDING

BACKGROUND OF THE INVENTION

1. Field of the Invention

The present invention is directed generally to an apparatus for affixing wires or wire ribbons to terminal elements, and more particularly to an apparatus having touch-down or pressure electrodes for producing wire bridges.

2. Description of the Related Art

An apparatus for micro-welding using a split electrode is disclosed in the periodical "Feinwerktechnik", volume 75, 1971, pages 201–206. A repair method is described which eliminates errors occasionally occurring in the manufacture of electrical printed circuit boards. Such errors lead to inadmissibly constricted or interrupted interconnects. When the error locations are recognized, then gold-plated fine ribbons of nickel or fine ribbons of copper are placed over and metallically connected to the interconnects. Since the electrical printed circuit boards are subjected to a soldering process after being equipped with component parts, the repair of the interconnects is performed with micro-resistance welding so that the repair locations do not suffer damage do to temperatures occurring durring soldering and so that the connections do not undo again.

In the periodical "Feinwerktechnik", Volume 73, 1969, pages 209–216, an article investigates the influencing quantities occurring during micro-resistance spot welding of copper and nickel ribbons. A welding head disclosed therein is designed so that welding can be carried out not only with a direct electrode arrangement but also with an indirect electrode arrangement. Resistance spot welding with an indirect, parallel electrode arrangement, also referred to as gap welding, is especially well suited for contacting miniature component parts. The spacing of the indirectly arranged electrodes, which are also frequently referred to as touch-down or pressure electrodes, amounts up to 1 mm. The electrodes are connected to the electrode arm independently of one another by springs. This compensates for irregularities in the workpiece surface and guarantees approximately uniform surface pressure between the electrodes and the workpiece.

During the manufacture of motor vehicle ignition devices, wire bridges must frequently be welded in between the housing terminal lugs and the allocated terminals of ceramic thick-film substrates. The maximum height difference of the individual connection points amounts to approximately 50 mm. Thus, an oblique placement of the wire bridges and a vibration-proof connection with high mechanical and thermal loadability are required. Up to now, such wire bridges were produced by boss welding of flexible portions of thin sheets or by resistance welding of pre-bent, discrete wire sections in accordance with German published application No. 32 33 225.

SUMMARY OF THE INVENTION

An object of the present invention is to provide an apparatus for contacting wires or wire ribbons with resistance welding in a procedure that is superior in reliability and work productivity to the use of flexible portions of thin sheets or of pre-bent, discrete sections of wire.

In an apparatus for producing wire bridges using resistance welding and having pressure or touch-down electrodes arranged parallel to one another at a slight distance, this and other objects are inventively achieved in that one of the pressure electrodes is formed as a working electrode with a guide channel for wires or wire ribbons discharged at a one face thereof.

The present invention is based upon the perception that a wire guided in a working electrode or a wire ribbon guided in the working electrode can be welded to arbitrary terminal elements with resistance welding based upon the pressure electrode method. By appropriate, vertical movements of the electrode, wire or ribbon loops or bridges are formed between terminal elements having different height positions. Such bridges or loops guarantee vibration-proof connections between the terminal elements. A further advantage of the apparatus of the invention is that the weld connections can be quality checked by measuring the replenishment path of the electrodes after the welding. Inductive path measurements are particularly well suited for this purpose, such as by measuring a current flow induced through the two electrodes and through the welded connection.

In accordance with a preferred embodiment of the invention, the other touch-down, or pressure, electrode is formed as a contact electrode which is directly placed onto the terminal elements. The contact electrode is also placed on the terminal element next to the ribbons or wires, so that an especially flexible, overall manipulation of both electrodes derives. Furthermore, by the passage of direct current through the contact locations to be united thereby, the contact locations are heated to welding temperatures due to the electrical resistance of the material.

In accordance with another, preferred embodiment of the invention, a clamp mechanism for the wires or ribbons which is movable together with the working electrode is arranged before the discharge of the guide channel into the working electrode. This clamp device unreels the wire or ribbon during the motion sequence of the pressure electrodes. In particular, the wire or ribbon is unreeled from a supply reel. A wire clamp is closed until a first welding spot is approached. The clamp is opened before this spot is welded and then is closed again after a second welding spot has been set. An especially favorable guidance of the wire or ribbon is possible when the guide channel is conducted vertically through the working electrode in a longitudinal direction.

It has proven especially advantageous to form at least the face region of the working electrode of tungsten. A highly durable electrode is, thus, provided as a result.

Finally, the continuous manufacture of wire bridges or ribbon bridges is achieved by providing a cutter blade for the working electrode for cutting the wire or ribbon allocated to the working electrode. After the second welding spot has been set, the working electrode is moved back and the cutter blade cuts the wire or ribbon behind the weld.

BRIEF DESCRIPTION OF THE DRAWINGS

FIG. 1 is a perspective view of a contact arrangement with a highly schematic illustration of an apparatus for contacting wires according to the principles of the present invention;

FIG. 2 is a perspective view of a first method stage for manufacturing wire bridges using the apparatus of FIG. 1; and FIG. 3 is a perspective view of a second method step in a manufacture of a wire bridge using the apparatus of FIG. 1.

DESCRIPTION OF THE PREFERRED EMBODIMENTS

FIG. 1 shows two touch-down, or pressure, electrodes AE and KE having a generally standard structure in an indirect, parallel electrode arrangement that forms an electrode gap of, for example, 0.2 mm. The electrode forces to the two pressure electrodes AE and KE are separately adjustable, such as by electrode moving devices 10 and 12, respectively. Moreover, the two pressure electrodes AE and KE are arranged in a welding head 14 (not shown in detail) so that they can be moved in the three illustrates coordinate directions x,y and z relative to a workpice, such as by moving the welding head 14. Electrical power is supplied to the electrodes AE and KE by a power supply 16, shown schematically in FIG. 1. A welding head moving device 18 is included operatively connected to the welding head 14 so that the electrodes AE and KE can be moved together.

The illustrated arrangement differs from traditional electrodes arrangements in that the first pressure electrode AE is a working electrode, while the second pressure electrode serves merely as a contact electrode KE. A cylinderical guide channel FK extends vertically in a longitudinal direction through the working electrode AE. The guide channel FK is open at the lower face side or tip T of the electrode AE. The preferred embodiment of the electrode AE has at least the tip T composed of tungsten.

In one example, a wire D of diameter 0.4 mm and formed of tinned copper is conducted downwardly through the guide channel FK in the z-direction and is bent at a right angle toward the front of the electrode arrangement in the y-direction immediately at its discharge from the lower end face or tip T. The wire D is fed from a supply reel VR by a deflection roller UR which is movable together with the welding head 14. A clamp mechanism KD (shown schematically here) for the wire D is located between the deflection roller UR and the upper opening of the guide channel FK. The jaws of the clamp mechanism KD are movable together with the welding head and can be opened and closed, as indicated by the two double arrows Pf1. The clamp mechanism KD draws the wire D off the supply reel VR during a motion sequence or step of forming wire bridges or wire loops. The clamp KD is kept closed until a first welding spot is approached. The clamp KD is then opened before the first welding spot is welded and is closed again after the setting of a second welding spot.

In FIGS. 2 and 3 are shown the application of the present apparatus in the production of wire bridges in a motor vehicle ignition device, for example. In accordance with FIG. 1, the wire D is conducted through the electrode AE and is bent horizontally. In FIG. 2, the wire is first welded to one of terminals FS of a thick-film substrate KS by means of resistance welding. The wire is pressed onto the shaped terminal FS, which is composed of an iron-nickel alloy, with an electrode force applied by the working electrode AE of, for example, 2.5 N. In other words, the bent portion of the wire D is under the tip T of the working electrode AE and is pressed onto the terminal by the downward pressure of the electrode moving device 10 mounted in the welding head 14 and acting through the electrode AE. The contact electrode KE is pressed against the same shaped terminal FS immediately next to the working electrode AE with a seperatly adjustable electrode force of, for example, 4 N. In other words, the contact electrode KE directly contacts the terminal FS with force caused by the electrode moving device 12.

The welding current is then switched on. A constant current of, for example, 1100 amps briefly flows, for example, for 6 msec through the electrodes AE and KE from the power supply 16. The current flows from the working electrode AE to the wire D, to the terminal FS, and to the contact electrode KE, so that contact locations between the wire D and the shaped terminal FS are heated to a welding temperature due to the electrical resistance of the material. Thus, a first spot weld SP1 as shown in FIG. 3 is formed.

After the first spot weld SP1 is formed, the working electrode AE and the second contact electrode KE are raised to the height of a housing terminal lug GF and the wire D is fed downward through the guide channel FK, such as by the deflection roller UR. The deflection roller UR is is not required in every instance, however, since the motion of the welding head 14 may cause the wire D to feed through the guide channel FK. A loop or wire bridge DB is formed by the programmed displacement of the welding head. The wire D is welded to an allocated housing terminal lug GF in the same fashion already set forth with respect to the weld to the terminal SF. A second weld spot SP2 is formed on the terminal lug GF.

The working electrode AE together with the contact electrode KE then are moved back in the horizontal y-direction and a cutter blade SM cuts the wire D off behind the second weld spot SP2. The actuation of the cutter blade SM, which is preferrably mounted in the welding head 14, is indicated by a double arrow Pf2. As a result of the programmed displacement of the weld head 14, the wire D already lies under the working electrode AE bent off horizontally and the next weld point on the ceramic thick-filmed substrate KS can then be approached to form a next wire bridge DB.

Thus, the manufacture of wire or ribbon bridges, such as for motor vehicle ignition devices, is provided by the apparatus of the present invention. The inventive device permits wire bridges to be welded continuously from wire supplied on a supply reel VR.

Although other modifications and changes may be suggested by those skilled in the art, it is the intention of the inventor to embody within the patent warranted hereon all changes and modifications as reasonably and properly come within the scope of his contribution to the art.

I claim:

1. An apparatus for affixing bare wires and/or bare wire ribbons to terminal elements with resistance welding, comprising:
    first and second pressure electrode disposed parallel to one another at a relatively slight distance apart, said first contact being formed as a working electrode including a guide channel being a generally longitudinal opening through said working electrode, said opening discharging at an end face of said working electrode for conducting the bare wires and/or bare wire ribbons through said guide channel to said end face.

2. An apparatus as claimed in claim 1, wherein said second pressure electrode is an electrical contact electrode that is adapted to be directly placed onto one of the terminal elements.

3. An apparatus as claimed in claim 1, further comprising:
means for selectively clamping the wires and/or wire ribbons, said clamping means being movable together with said working electrode and preceding an admission opening of said guide channel into said working electrode.

4. An apparatus as claimed in claim 1, further comprising:
means for unreeling the wires and/or wire ribbons from a supply reel for introduction into said guide channel.

5. An apparatus as claimed in claim 1, wherein said guide channel extends vertically through said working electrode in a longitudinal direction.

6. An apparatus as claimed in claim 1, wherein said working electrode has at least said end face composed of tungsten.

7. An apparatus as claimed in claim 1, further comprising:
a cutter blade allocated to said working electrode for severing the wires and/or wire ribbons.

8. A resistance welding apparatus for affixing a non-insulated wire to a terminal, comprising:
a working electrode having an end face for selective placement adjacent the terminal and a longitudinal guide channel open at said end face, the wire extending along said guide channel and extending from said guide channel at said end face for selective contact with the terminal;
means for selectively moving the wire along said guide channel;
a contact electrode having an end face disposed adjacent said end face of said working electrode for selective electrical contact with the terminal, said contact electrode being spaced from said working electrode;
means for applying electrical power between said working electrode and said contact electrode when said contact electrode is in contact with the terminal and when the wire extending from said end face of said working contact is in contact with the terminal to weld the wire to the terminal.

9. A resistance welding apparatus as claimed in claim 8, wherein said means for selectively moving the wire includes:
a clamp selectively engaging the wire before the wire enters said guide channel;
means for supplying the wire from a stock of wire; and
means for selectively drawing the wire from said wire supplying means for feeding into said guide channel.

10. A resistance welding apparatus as claimed in claim 8, further comprising:
means for selectively moving said working electrode and said contact electrode from the terminal to another terminal after welding the wire to the terminal to form a wire bridge between the terminal and the another terminal so that a second weld to the another terminal is formed; and
means for cutting the wire between the second weld to the another terminal and said end face of said working electrode.

* * * * *